(12) United States Patent
Chiu (10) Patent No.: US 8,910,475 B2
(45) Date of Patent: Dec. 16, 2014

(54) BUOYANCY POWER GENERATING APPARATUS

(75) Inventor: Ming-Chin Chiu, Changhua (TW)

(73) Assignee: Jun Fu Clean Energy Co., Ltd., Changhua (TW)

( * ) Notice: Subject to any disclaimer, the term of this patent is extended or adjusted under 35 U.S.C. 154(b) by 272 days.

(21) Appl. No.: 13/485,189

(22) Filed: May 31, 2012

(65) Prior Publication Data
US 2013/0318960 A1 Dec. 5, 2013

(51) Int. Cl.
*F03B 17/02* (2006.01)

(52) U.S. Cl.
USPC .............................................. 60/496; 60/495

(58) Field of Classification Search
CPC ......... Y02E 10/20; Y02E 10/38; F03B 17/02; F03B 17/025; B63B 22/00; B63B 22/12; B63B 22/18; B63B 22/22; B63B 22/24; B63B 22/26

USPC ........................................................ 60/495–496
See application file for complete search history.

(56) References Cited

U.S. PATENT DOCUMENTS

2006/0267346 A1* 11/2006 Chen ................................ 290/54
2008/0092535 A1* 4/2008 Razack ............................ 60/496

* cited by examiner

*Primary Examiner* — Thomas Denion
*Assistant Examiner* — Philip Eklem
(74) *Attorney, Agent, or Firm* — Marger Johnson & McCollom, P.C.

(57) ABSTRACT

A buoyancy power generating apparatus includes: a tank adapted to receive liquid therein; a buoyancy mechanism disposed in the tank and including a bladder support and a bladder supported on the bladder support; a vertical support disposed outwardly of the tank; a weight unit supported movably on the vertical support; and a transmission coupled to the buoyancy mechanism and the weight unit so that the weight unit can be driven by the bladder to move upwardly during upward movement of the bladder and that the weight unit can be moved downwardly by gravity when the bladder is deflated.

10 Claims, 10 Drawing Sheets

BUOYANCY POWER GENERATING APPARATUS

BACKGROUND OF THE INVENTION

1. Field of the Invention

The invention relates to a buoyancy power generating apparatus, and more particularly to a buoyancy power generating apparatus including a bladder and a weight unit capable of being lifted by an upward movement of the bladder by a buoyant force so as to accumulate a potential energy.

2. Description of the Related Art

U.S. Pat. No. 4,242,868 discloses a hydro-power generation apparatus that includes a U-shaped conduit having two substantially vertical legs, a belt-and-link unit connected to the U-shaped conduit, a plurality of expansible and contractible bellows members attached to the belt-and-link unit, means for contracting the bellows members in one of the legs and expanding the bellows members in the other of the legs, and a quantity of water contained in the conduit and exerting a buoyant force on the bellows members when being expanded, thereby moving the belt-and-link unit together with the bellows members.

SUMMARY OF THE INVENTION

An object of the present invention is to provide a buoyancy power generating apparatus having an assembly of a tank and a buoyancy mechanism that has a simple structure.

According to one aspect of the present invention, there is provided a buoyancy power generating apparatus that comprises: a tank adapted to receive a liquid therein; a buoyancy mechanism disposed in the tank and including a bladder support and a bladder supported on the bladder support, the buoyancy mechanism being movable upwardly in the tank by a buoyant force of the liquid when the bladder is inflated and being movable downwardly in the tank by gravity when the bladder is deflated; a vertical support disposed outwardly of the tank; a weight unit supported movably on the vertical support; and a transmission coupled to the buoyancy mechanism and the weight unit so that the weight unit can be driven by the bladder to move upwardly along the vertical support during upward movement of the bladder and that the weight unit can be moved downwardly along the vertical support by gravity when the bladder is deflated.

According to another aspect of the present invention, there is provided a buoyancy mechanism for a buoyancy power generating apparatus. The buoyancy mechanism comprises: a bladder; and a collapsible cage surrounding and urging against the bladder so that the collapsible cage can be extended by expansion of the bladder when the bladder is inflated and can provide a contraction force acting on the bladder.

BRIEF DESCRIPTION OF THE DRAWINGS

In drawings which illustrate an embodiment of the invention.

DETAILED DESCRIPTION OF THE PREFERRED EMBODIMENT

Figure 1:
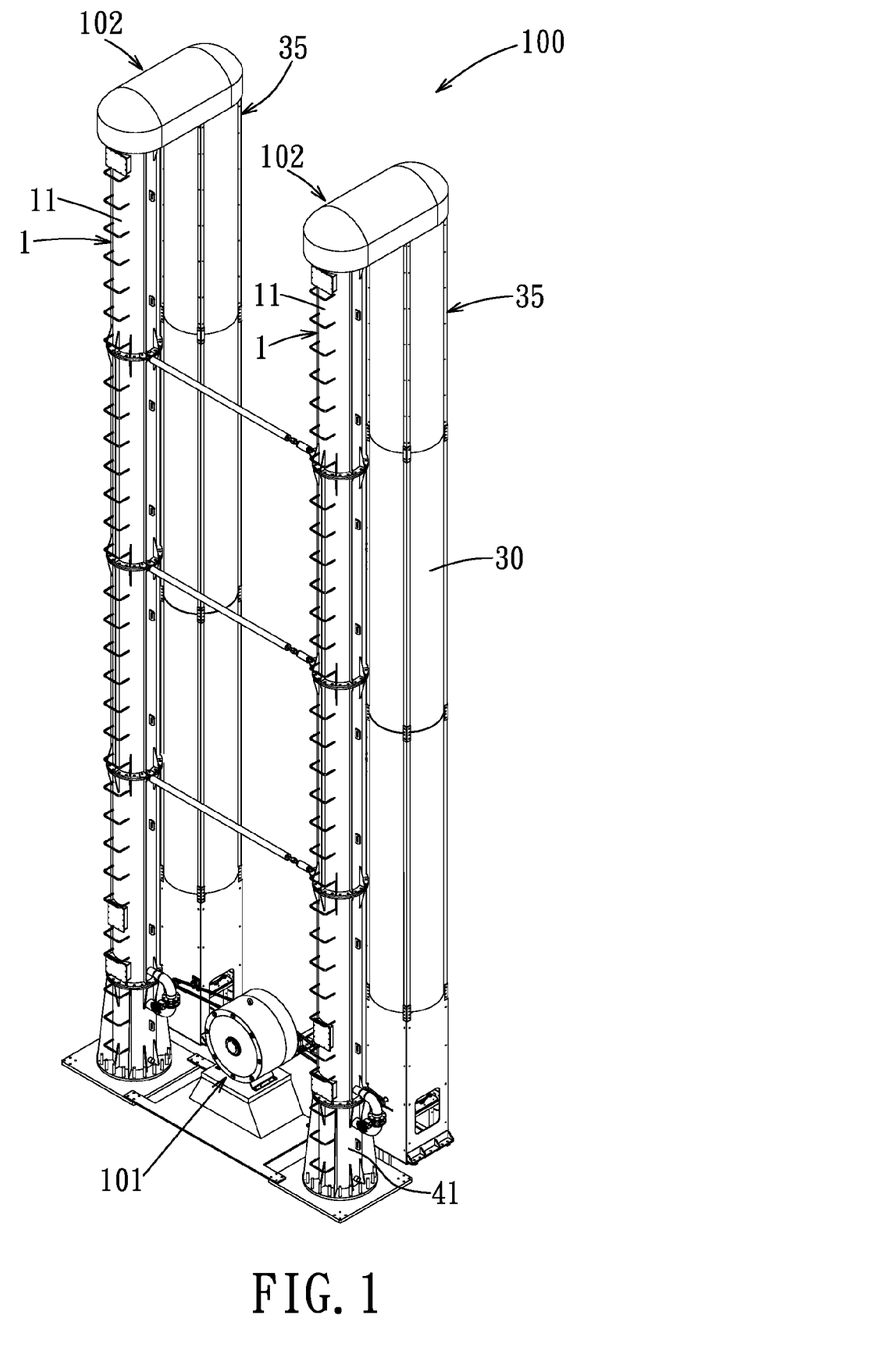
FIG. 1 is a perspective view of the preferred embodiment of a power generating system according to the present invention.
Figure 2:
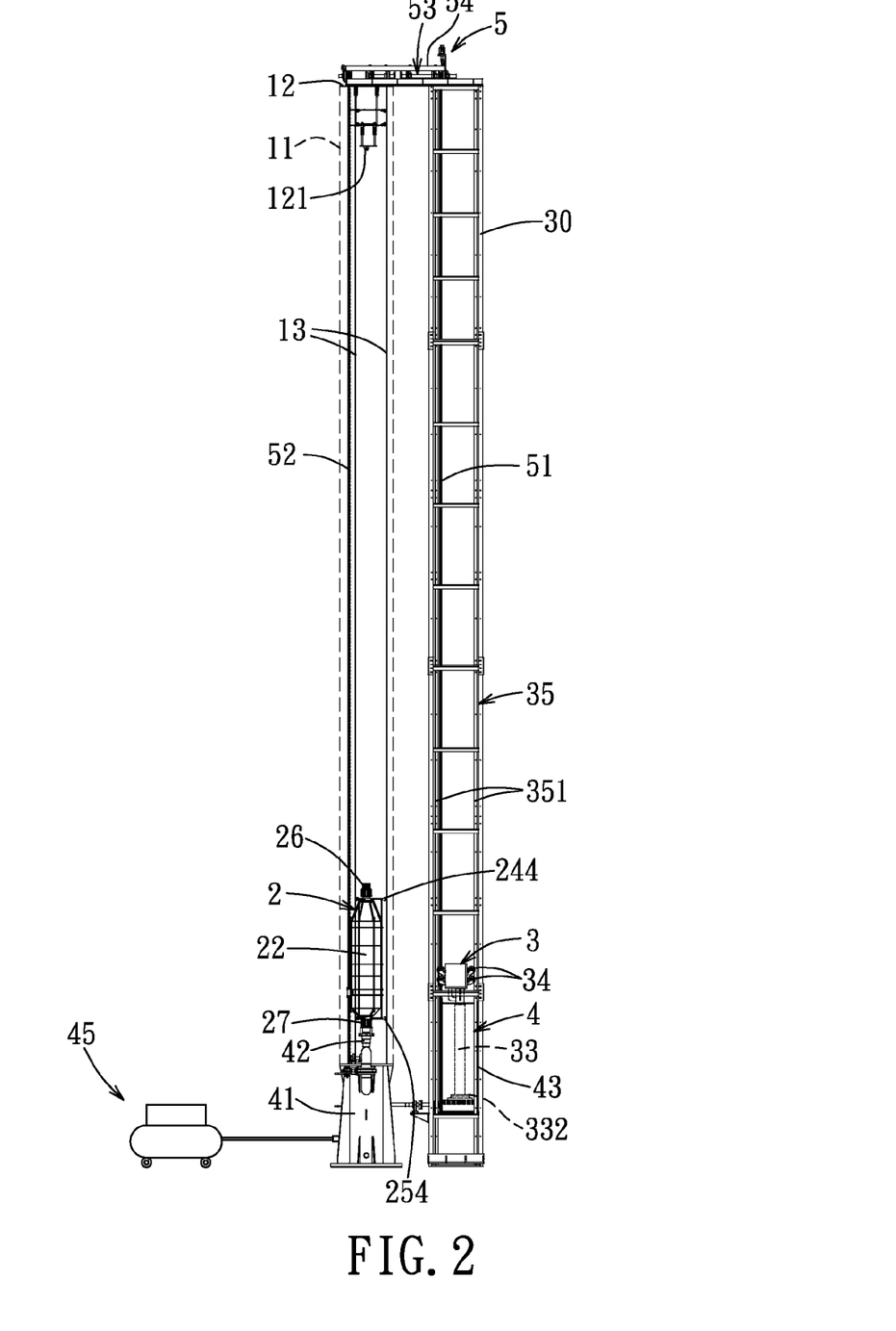
FIG. 2 is a schematic side view of a buoyancy power generating apparatus of the preferred embodiment.

FIGS. 1 and 2 illustrate the preferred embodiment of a power generating system 100 according to the present invention. The power generating system 100 includes a power-generating motor 101 and two buoyancy power generating apparatuses 102 connected to the power-generating motor 101 for alternately driving a shaft (not shown) of the power-generating motor 101 for converting mechanical energy into electrical power. It is noted that the number of the buoyancy power generating apparatuses 102 can also be one or greater than two.

Each of the buoyancy power generating apparatuses 102 includes: a tank 1 adapted to receive liquid therein; a buoyancy mechanism 2 disposed in the tank 1; a vertical support 35 disposed outwardly of the tank 1; a weight unit 3 supported movably on the vertical support 35; an inflating mechanism 4; and a transmission 5 coupled to the buoyancy mechanism 2 and the weight unit 3.

Figure 5:
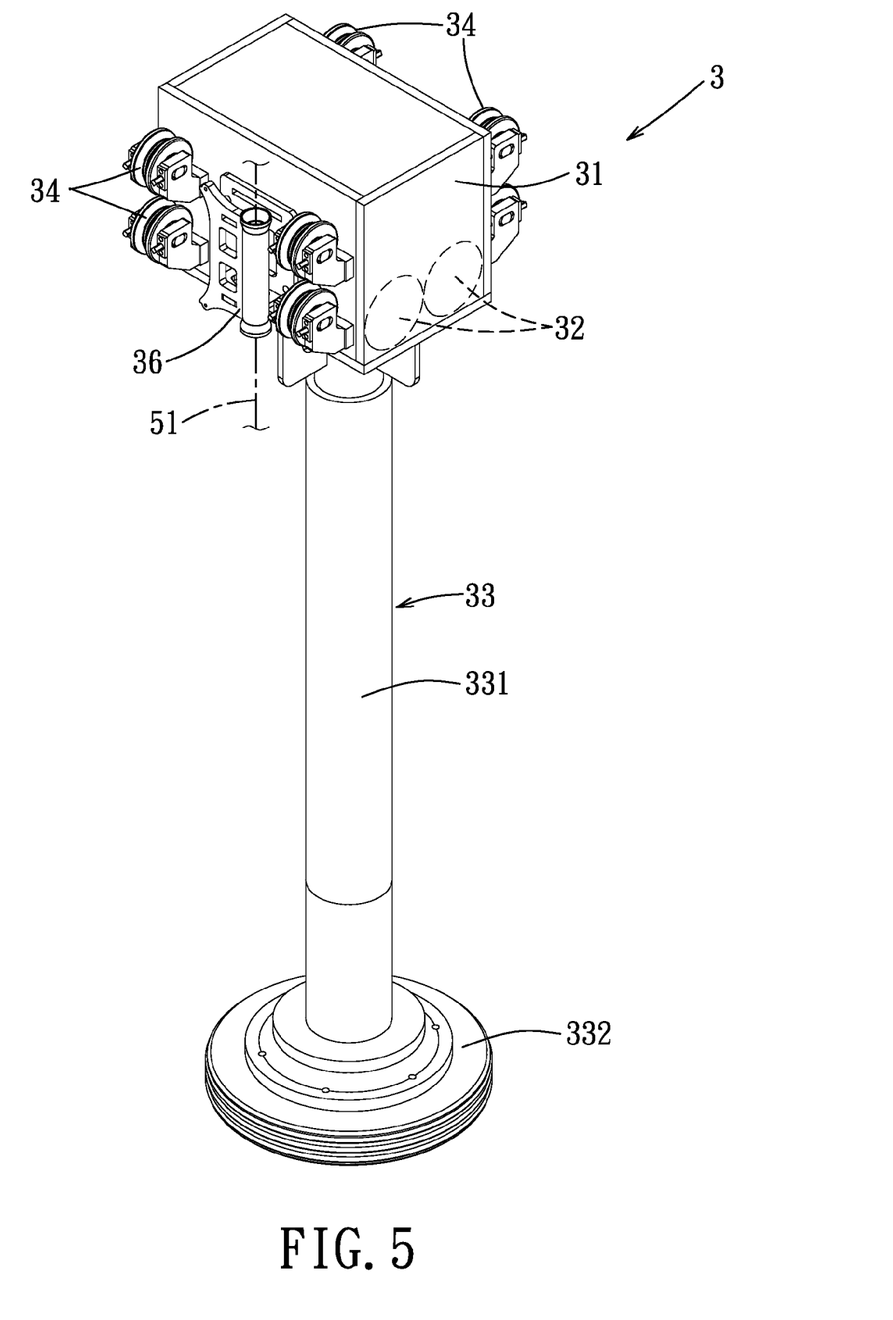
FIG. 5 is a perspective view of an assembly of a weight unit and a piston of the preferred embodiment.

Referring to FIGS. 2 and 5, the vertical support 35 is disposed adjacent to the tank 1, and includes a housing 30 and a plurality of vertical rails 351 mounted on the housing 30. The weight unit 3 is disposed movably in the housing 30 and includes a casing 31, a plurality of weights 32 mounted in the casing 31, a first chain connector 36 secured to the casing 31, and a plurality of guiding wheels 34 provided on two opposite sides of the casing 31 and in sliding contact with the vertical rails 351, respectively, so as to permit the weight unit 3 to be glidable on the vertical rails 351.

Referring to FIGS. 1 and 2, the tank 1 includes a tank body 11, a top cover 12 disposed on the tank body 11, and a plurality of guiding rails 13 secured to the interior of the tank body 11 and extending along the length of the tank 1. The top cover 12 is provided with a valve opener extending into the tank 1 and having a conical end 121.

Referring to FIGS. 1 to 4, the buoyancy mechanism 2 includes a bladder support 21 and an bladder 22 supported on the bladder support 21. The buoyancy mechanism 2 is movable upwardly in the tank 1 by a buoyant force of the liquid when the bladder 22 is inflated (see FIG. 3), and is movable downwardly in the tank 1 by gravity when the bladder 22 is deflated (see FIG. 4). The bladder support 21 includes a collapsible cage 21a surrounding and urging against the bladder 22 so that the collapsible cage 21a can be extended (see FIG. 3) by expansion of the bladder 22 when the bladder 22 is inflated. The collapsible cage 21a is capable of providing a resilient contraction force acting on the bladder 22, and is collapsible (see FIG. 4) when the bladder 22 is deflated.

Figure 3:
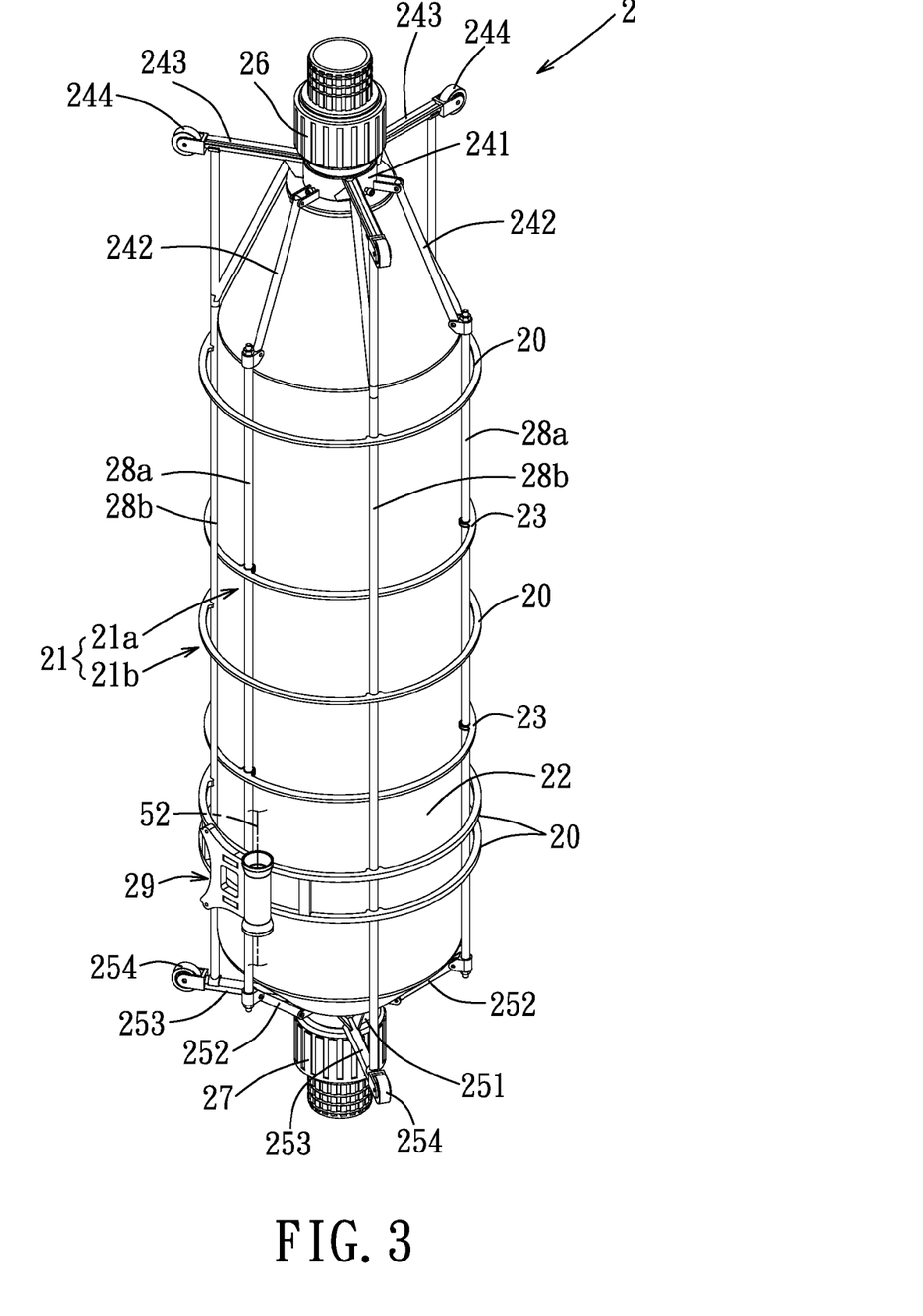
FIG. 3 is a perspective view illustrating an inflated state of a bladder of a buoyancy mechanism of the preferred embodiment.
Figure 4:
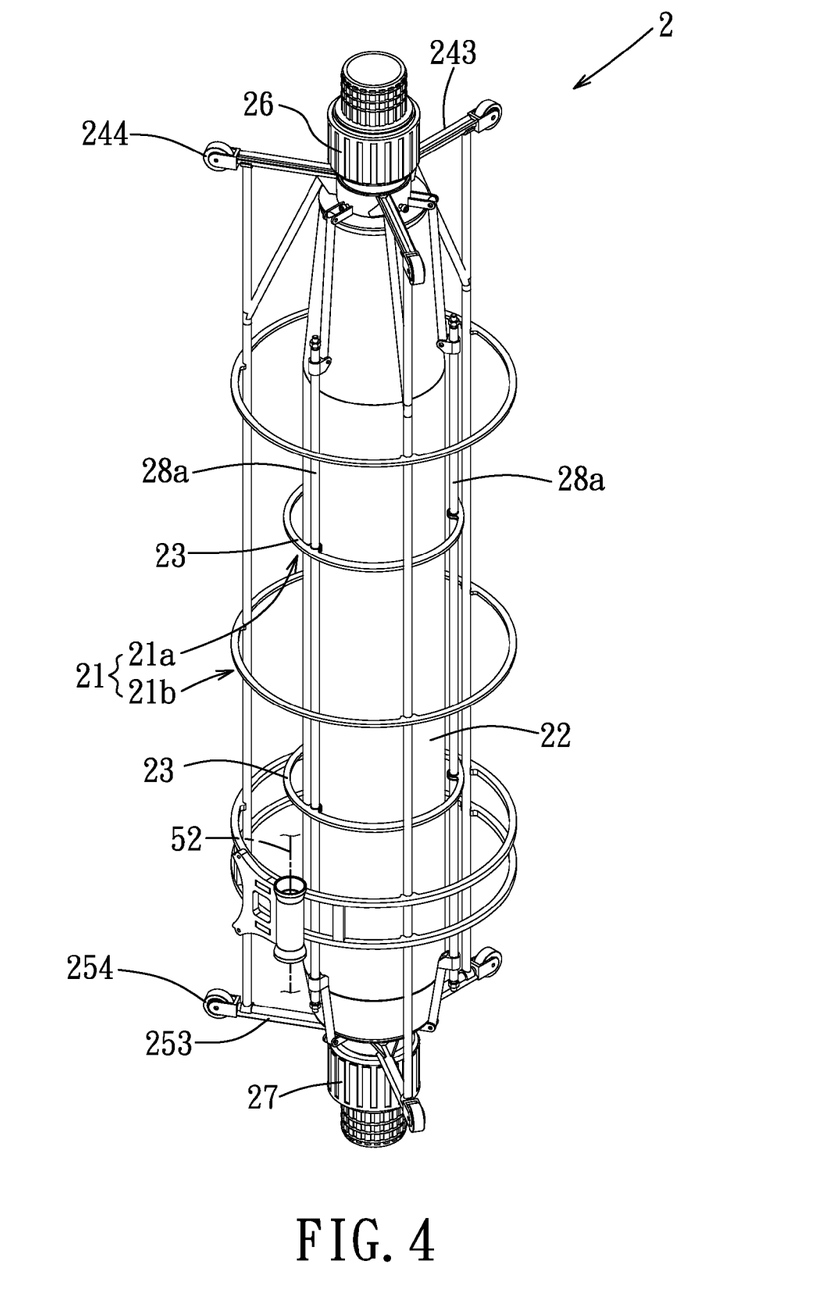
FIG. 4 is a perspective view illustrating a deflated state of the bladder of the buoyancy mechanism of the preferred embodiment.

The collapsible cage 21a includes an upper rod support 241 connected to the bladder 22, a lower rod support 251 connected to the bladder 22 and disposed below the upper rod support 241, a plurality of upper pivot links 242 pivoted to the upper rod support 241, a plurality of lower pivot links 252 pivoted to the lower rod support 251, a plurality of first vertical rods 28a having opposite ends that are connected pivotally and respectively to a respective one of the upper pivot links 242 and a corresponding one of the lower pivot links 252, and at least one elastic ring (in this embodiment, two elastic rings 23 are provided) connected to the first vertical rods 28a for urging the first vertical rods 28a to abut against the bladder 22, thereby providing the resilient contraction force on the bladder 22. The elastic rings 23 may be made from a rubber material.

The bladder support 21 further includes a non-collapsible cage 21b that surrounds the collapsible cage 21a and that has a plurality of upper bars 243 secured to and extending radially from the upper rod support 241, a plurality of lower bars 253 secured to and extending radially from the lower rod support 251 and disposed below the upper bars 243, a plurality of second vertical rods 28b having opposite ends that are secured respectively to a respective one of the upper bars 243 and a corresponding one of the lower bars 253 and disposed around the elastic rings 23, and at least one supporting ring 20 (in this embodiment, a plurality of the supporting rings 20 are provided) connected to the second vertical rods 28b. The upper and lower bars 243, 253 have distal ends provided with wheels 244, 254, respectively. A second chain connector 29 is secured to a lowermost pair of the supporting rings 20.

The wheels 244, 254 of the upper and lower bars 243, 253 of the bladder support 21 are in sliding contact with the guiding rails 13 so as to permit the buoyancy mechanism 2 to be glidable on the guiding rails 13 during upward or downward movement of the buoyancy mechanism 2 along the tank 1.

The bladder 22 has top and bottom ends, and is provided with a top check valve 26 (which is normally closed) mounted on the top end of the bladder 22 and operable for deflation of the bladder 22, and a bottom check valve 27 (which is normally closed) mounted on the bottom end of the bladder 22 and operable for inflation of the bladder 22.

The inflating mechanism 4 includes a gas-storing container 41, a gas valve 42, and a cylinder 43 secured to a lower section of the vertical support 35. The gas-storing container 41 is connected to and is disposed below the tank 1, and is connected to and is in fluid communication with the cylinder 43 through a pipe (not shown). The gas valve 42 is a normally closed check valve, is disposed in a lower portion of the tank 1 for releasably connecting with the bottom check valve 27, and is connected to and is in fluid communication with the gas-storing container 41 so as to be in fluid communication with the cylinder 43 through the gas-storing container 41.

Referring to FIGS. 2 and 5, a piston 33 is secured to and is disposed below the weight unit 3, includes a piston head 332 and a piston rod 331 interconnecting the piston head 332 and the casing 31 of the weight unit 3, and is co-movable with the weight unit 3 so as to be movable into and out of the cylinder 43. Downward movement of the piston 33 in the cylinder 43 results in compression of air from the cylinder 43 into the gas-storing container 41. In addition, an air compressor 45 (see FIG. 2) is connected to the gas-storing container 41 and controllably supplies air into the gas-storing container 41 to ensure that the bladder 22 is sufficiently inflated in order to be lifted by the buoyant force of the liquid in the tank 1.

Figure 6:
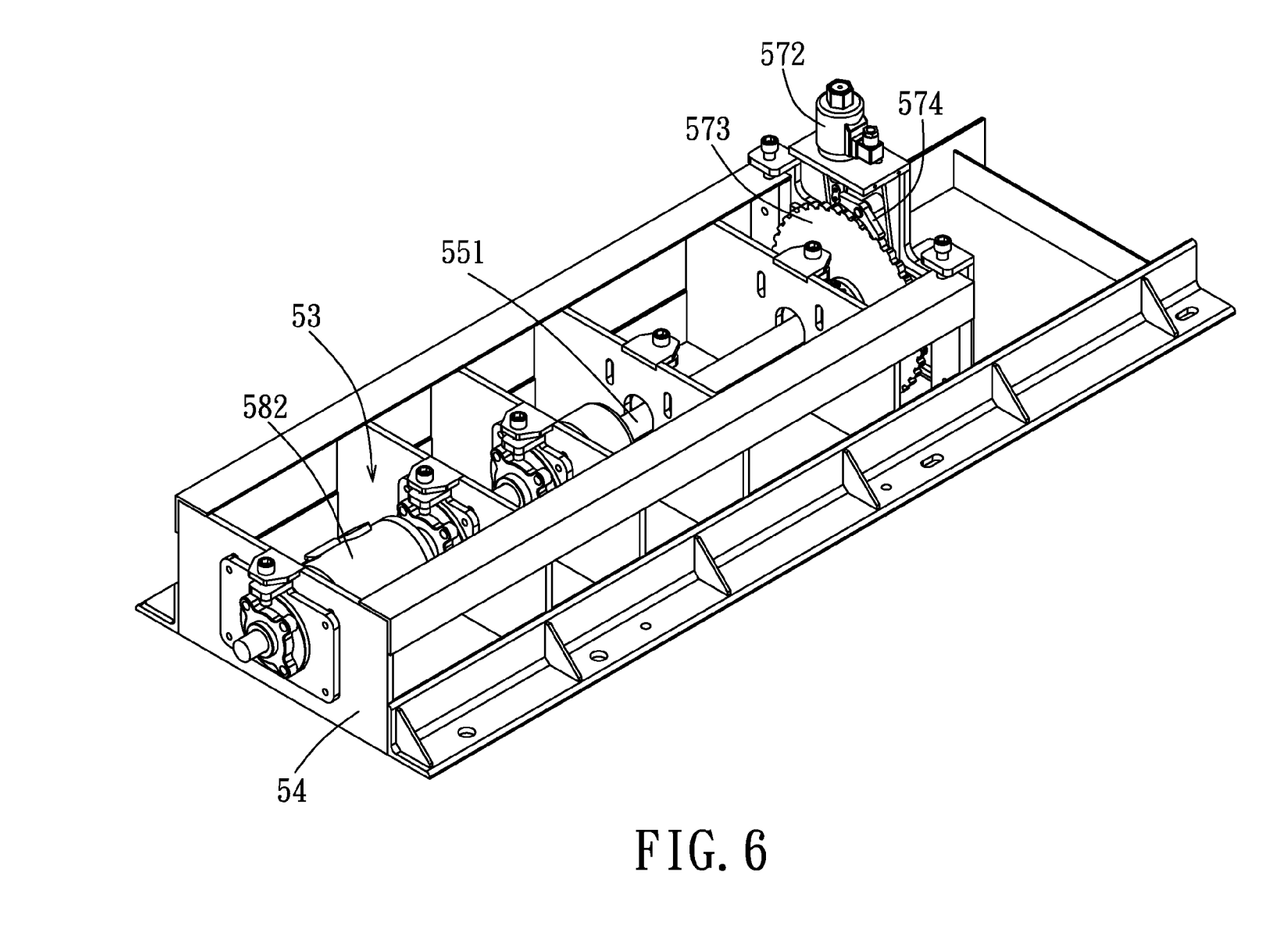
FIG. 6 is a perspective view of a transmission of the preferred embodiment.
Figure 7:
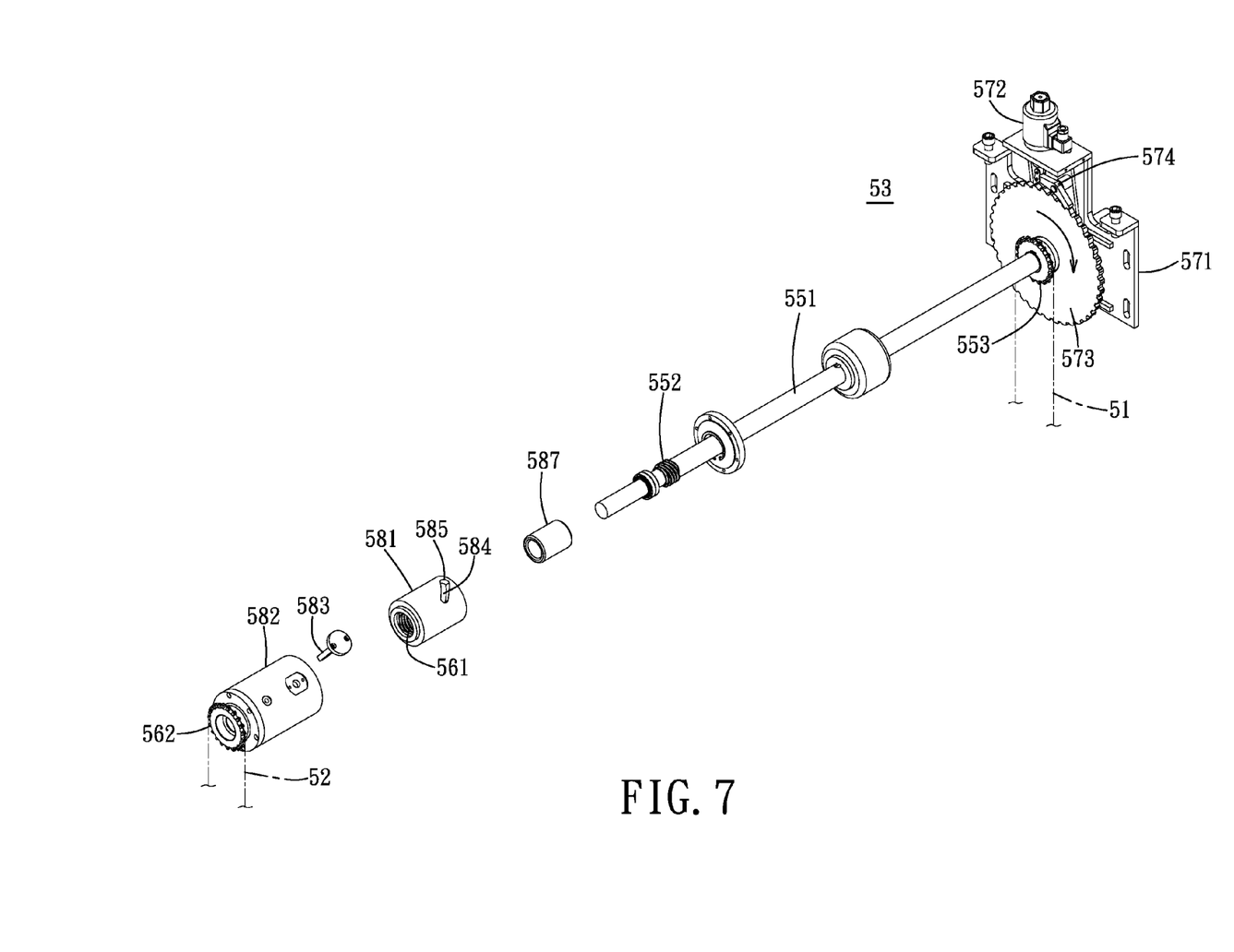
FIG. 7 is an exploded perspective view of a clutch of the transmission of the preferred embodiment.

Referring to FIGS. 2, 6 and 7, the transmission 5 includes a seat 54 mounted on the top cover 12 of the tank 1 and a top end of the vertical support 35, first and second endless linking elements 51, 52, a clutch 53 mounted on the seat 54, and first and second sprockets (not shown) mounted respectively on the lower section of the vertical support 35 and the lower portion of the tank 1. In this embodiment, the first and second endless linking elements 51, 52 are in the form of endless chains. Alternatively, the first and second endless linking elements 51, 52 may be in the form of endless belts. The first sprocket is coupled to the power-generating motor 101 for connecting the first endless element 51 to the power-generating motor 101.

The clutch 53 includes an upper shaft 551, an outer sleeve 582 with two end bearings (not shown) sleeved rotatably on the upper shaft 551 for driving rotation of the upper shaft 551 in a manner to be described hereinafter, a first upper gear 553 provided on the upper shaft 551, and a second upper gear 562 provided on the outer sleeve 582. The second endless linking element 52 is trained on the second upper gear 562 and the second sprocket, and is connected to the bladder support 21 through the second chain connector (see FIG. 3) so as to drive rotation of the outer sleeve 582 when the buoyancy mechanism 2 is moved upwardly by the buoyant force. The first endless linking element 51 is trained on the first upper gear 553 and the first sprocket, and is connected to the weight unit 3 through the first chain connector 36 (see FIG. 5) so as to lift the weight unit 3 to accumulate a potential energy through rotation of the upper shaft 551 driven by the outer sleeve 582 when the buoyancy mechanism 2 is moved upwardly by the buoyant force. The accumulated potential energy of the weight unit 3 can be converted into a kinetic energy to drive the power-generating motor 101 through the first sprocket and the first endless linking element 51 when the weight unit 3 falls along the vertical support 35 by gravity.

Figure 9:
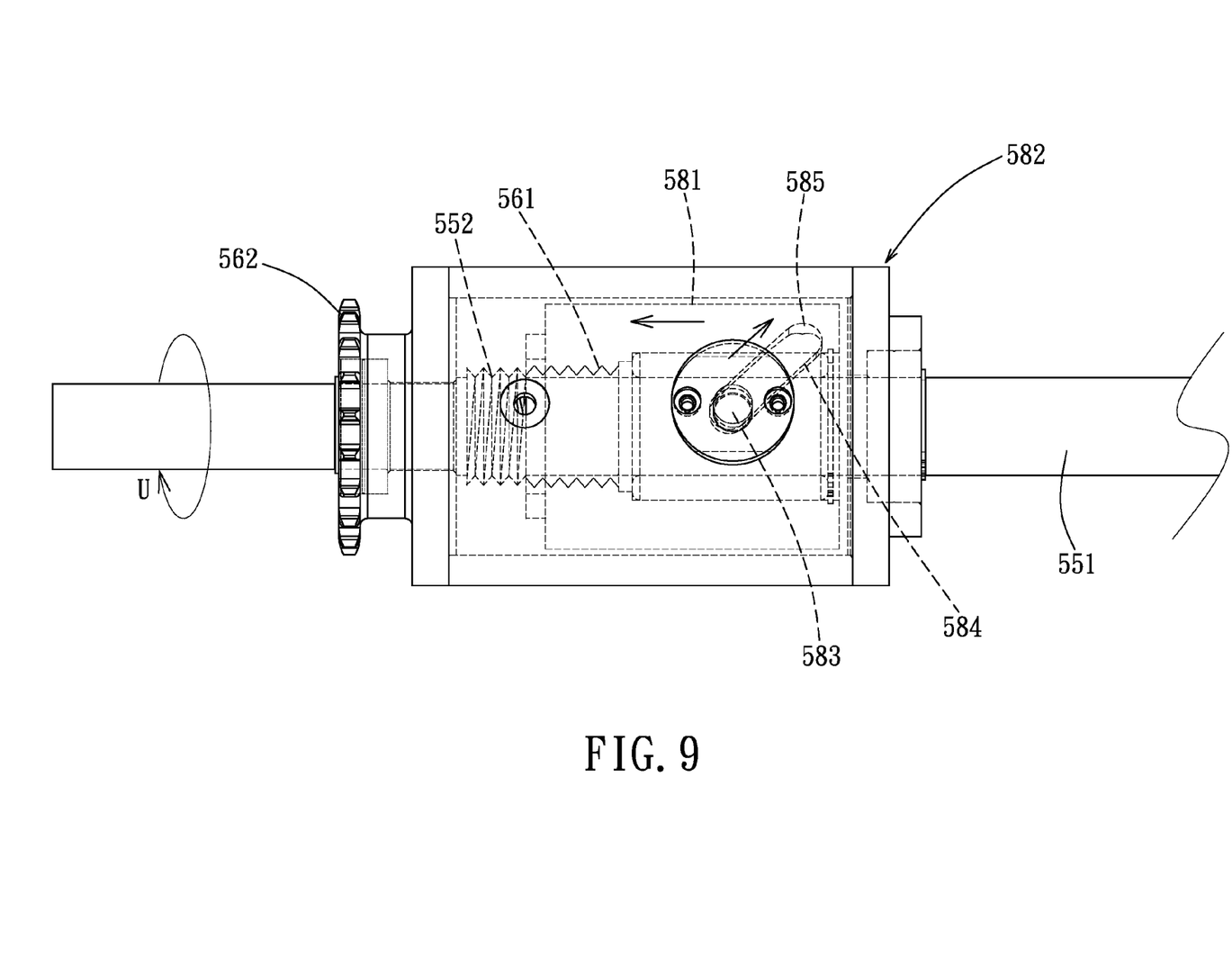
FIG. 9 is a fragmentary schematic view illustrating a state in which an inner sleeve is moved axially to engage an outer thread of an upper shaft of the transmission of the preferred embodiment.
Figure 10:
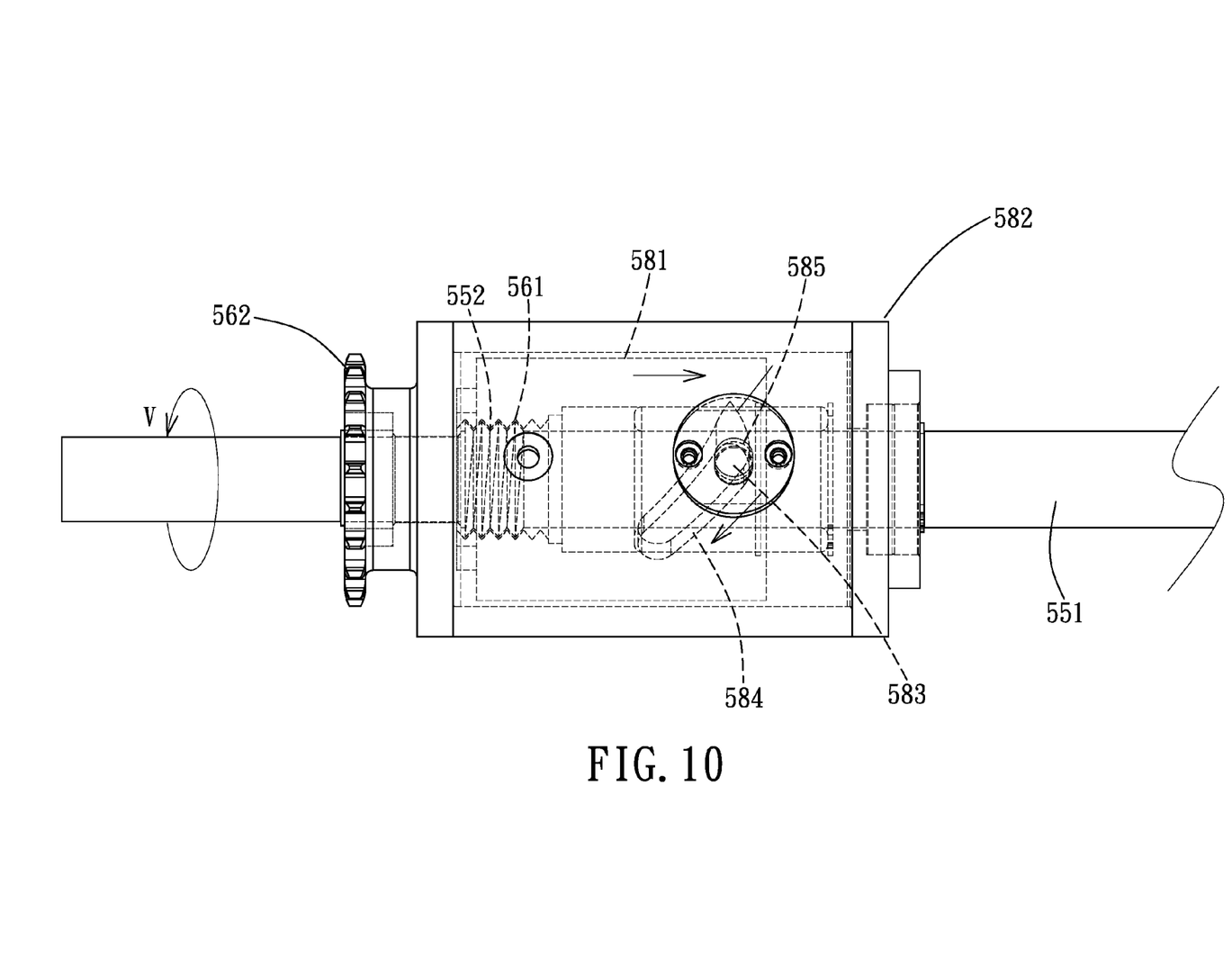
FIG. 10 is a fragmentary schematic view illustrating another state in which the inner sleeve is moved axially to disengage the outer thread of the upper shaft of the transmission of the preferred embodiment.

The upper shaft 551 is formed with an outer thread 552. The clutch 53 further includes a cam 583 that is secured to the outer sleeve 582, an inner sleeve 581 that is disposed in the outer sleeve 582, that is sleeved around the upper shaft 551 and that is formed with an inner thread 561 and a helically-extending slot 584, and a bearing sleeve 587 that is disposed between the upper shaft 551 and the inner sleeve 581, that is sleeved on the upper shaft 551 and that is in sliding contact with the inner sleeve 581. The slot 584 is defined by a slot-defining wall 585. The cam 583 extends into the slot 584 and is in sliding contact with the slot-defining wall 585 so as to drive axial movement of the inner sleeve 581 along the upper shaft 551 through the cam-and-cam follower mechanism when the outer sleeve 582 rotates. The inner thread 561 of the inner sleeve 581 is moved toward the outer thread 552 to threadedly engage the outer thread 552 (see FIG. 9) when the outer sleeve 582 rotates in a first rotational direction (U) (see FIG. 9) and is moved away from the outer thread 552 to threadedly disengage the outer thread 552 (see FIG. 10) when the outer sleeve 582 rotates in a second rotational direction (V) opposite to the first rotational direction (U) (see FIG. 10).

The transmission 5 further includes a bracket 571, a pawl 574 mounted swingably on the bracket 571, a ratchet gear 573 mounted on the upper shaft 551 so as to be co-rotatable with the upper shaft 551, and a pawl controlling member 572. The ratchet gear 573 slides over the pawl 574 when the upper shaft 551 rotates in the first rotational direction (U), and is releasably caught by the pawl 574 when the upper shaft 551 rotates in the second rotational direction (V). The pawl controlling member 572 is associated with the pawl 574 in such a manner that the pawl 574 can be controlled to swing to a releasing position (not shown) by the pawl controlling member 572 so as to release the ratchet gear 573 from being caught by the pawl 574 when the upper shaft 551 together with the ratchet 573 rotates in the second rotational direction (V). Since the interaction between the pawl 574 and the ratchet gear 573 is performed in a conventional manner of a ratchet mechanism, a detailed description thereof is omitted for the sake of brevity.

Figure 8:
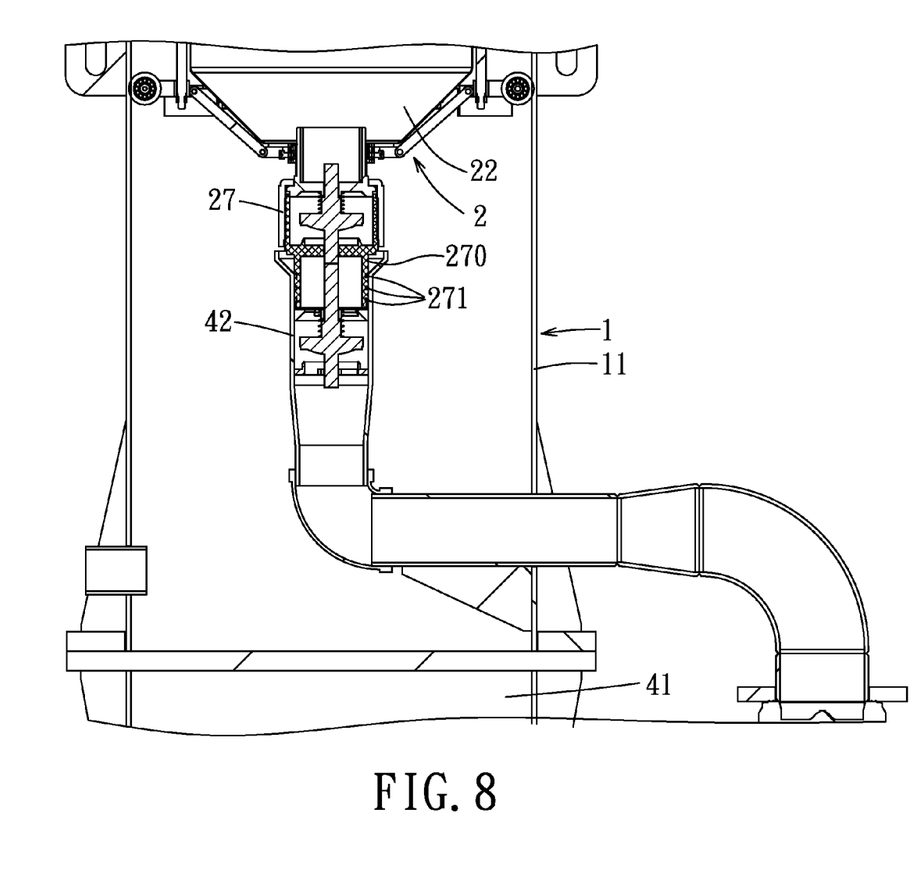
FIG. 8 is a fragmentary partly sectional view illustrating a state in which a bottom check valve is docked into a gas valve of the preferred embodiment.

In operation, when the buoyancy mechanism 2 is disposed at the lower portion of the tank 1, the bottom check valve 27 is sealingly docked into the gas valve 42 by the weight of the buoyancy mechanism 2 (see FIGS. 2 and 8), which permits fluid communication between the bottom check valve 27 and the gas valve 42 and discharging of air from the gas-storing container 41 into the bladder 22. It is noted that in order to increase the sealing effect between the bottom check valve 27 and the gas valve 42, a plurality of elastic sealing rings 271 are provided (see FIG. 8) to be mounted on a connecting end 270 of the bottom check valve 27 to contact sealingly a docking end of the gas valve 42. When the bladder 22 expands to an extent that the buoyant force of the liquid in the tank 1 is greater than the weight of the buoyancy mechanism 2, the buoyancy mechanism 2 starts rising to disconnect the bottom check valve 27 from the gas valve 42. The second endless linking element 52 is moved by the upward movement of the buoyancy mechanism 2 so as to drive rotation of the outer sleeve 582 together with the cam 583 in the first rotational direction (U), which drives axial movement of the inner sleeve 581 to permit threaded engagement between the inner thread 561 and the outer thread 552 so as to couple the outer sleeve 582 to the upper shaft 551, which, in turn, permits co-rotation of the outer sleeve 582 and the upper shaft 551 in the first rotational direction (U). The first endless linking element 51 is then driven by the upper shaft 551 to lift the weight unit 3 together with the piston 33 along the vertical support 35. When the buoyancy mechanism 2 is moved upwardly to an upper position (not shown) that the conical end 121 of the valve opener is thrust into the top check valve 26, the bladder 22 starts being deflated and the deflation is accelerated by the contraction force exerted by the elastic rings 23 on the bladder 22. As soon as the bladder 22 is deflated to an extent that the weight of the buoyancy mechanism 2 is greater than the buoyant force of the liquid, the buoyancy mechanism 2 starts falling by gravity to disconnect the top check valve 26 from the conical end 121 of the valve opener. Since the upper shaft 551 is prevented from rotation in the second rotational direction (V) due to the interaction between the pawl 574 and the ratchet gear 573, the fall of the buoyancy mechanism 2 causes the second endless linking element 52 to drive co-rotation of the outer sleeve 582 and the inner sleeve 581 in the second rotational direction (V) relative to the upper shaft 551, which results in disengagement between the inner thread 561 and the outer thread 552, thereby decoupling the outer sleeve 582 and the upper shaft 551. Meanwhile, the weight unit 3 together with the piston 33 is immobilized by the interaction between the pawl 574 and the ratchet gear 573. Hence, immediately after the release of the ratchet gear 573 from the pawl 574, the weight unit 3 together with the piston 33 starts falling along the vertical support 35 by gravity, which results in movement of the first endless linking element 51 to drive the power-generating motor 101 through the first sprocket (not shown) and to drive rotation of the upper shaft 551 in the second rotational direction (V). The use of the pawl controlling member 572 in controlling the positional state of the pawl 574 relative to the ratchet gear 573 for each of the buoyancy power generating apparatuses 102 permits the buoyancy power generating apparatuses 102 to alternately drive the power-generating motor 101 through the first sprockets and the first endless linking elements 51 of the buoyancy power generating apparatuses 102. In addition, the starting time of the fall of the weight unit 3 together with the piston 33 along the vertical support 35 is controlled so as to begin immediately after the bottom check valve 27 is docked into the gas valve 24 so that as soon as the piston 33 has fallen into the cylinder 43, the air in the cylinder 43 can be compressed and driven into the bladder 22 through the gas-storing container 41, the gas valve 42 and the bottom check valve 27.

With the inclusion of the weight unit 3 and the transmission 5 in the buoyancy power generating apparatus 102 of this invention, the assembly of the tank 1 and the buoyancy mechanism 2 can have a simple structure and can be easily fabricated compared to that (i.e., the assembly of the U-shaped conduit, the belt-and-link unit and the bellows members) of the aforementioned hydro-power generation apparatus disclosed in U.S. Pat. No. 4,242,868.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A buoyancy power generating apparatus comprising:
   a tank adapted to receive liquid therein;
   a buoyancy mechanism disposed in said tank and including a bladder support and a bladder supported on said bladder support, said buoyancy mechanism being movable upwardly in said tank by a buoyant force of the liquid when said bladder is inflated and being movable downwardly in said tank by gravity when said bladder is deflated;
   a vertical support disposed outwardly of said tank;
   a weight unit supported movably on said vertical support; and
   a transmission coupled to said buoyancy mechanism and said weight unit so that said weight unit can be driven by said bladder to move upwardly along said vertical support during upward movement of said bladder and that said weight unit can be 20 moved downwardly along said vertical support by gravity when said bladder is deflated;
   wherein said bladder support includes a collapsible cage surrounding and urging against said bladder so that said collapsible cage can be extended by expansion of said bladder when said bladder is inflated, said collapsible cage providing a resilient contraction force acting on said bladder and being collapsible when said bladder is deflated; and
   wherein said collapsible cage includes an upper rod support connected to said bladder, a lower rod support connected to said bladder and disposed below said upper rod support, a plurality of upper pivot links pivoted to said upper rod support, a plurality of lower pivot links pivoted to said lower rod support, a plurality of first vertical rods having opposite ends that are connected respectively to a respective one of said upper pivot links and a corresponding one of said lower pivot links, and at least one elastic ring connected to said first vertical rods for urging said first vertical rods to abut against said bladder.

2. The buoyancy power generating apparatus of claim 1, wherein said bladder support further includes a plurality of upper bars secured to and extending radially from said upper rod support, a plurality of lower bars secured to and extending radially from said lower rod support and disposed below said upper bars, a plurality of second vertical rods having opposite ends that are secured respectively to a respective one of said upper bars and a corresponding one of said lower bars and disposed around said elastic ring, and at least one supporting ring connected to said second vertical rods.

3. A buoyancy power generating apparatus comprising:
a tank adapted to receive liquid therein;
a buoyancy mechanism disposed in said tank and including a bladder support and a bladder supported on said bladder support, said buoyancy mechanism being movable upwardly in said tank by a buoyant force of the liquid when said bladder is inflated and being movable downwardly in said tank by gravity when said bladder is deflated;
a vertical support disposed outwardly of said tank;
a weight unit supported movably on said vertical support; and
a transmission coupled to said buoyancy mechanism and said weight unit so that said weight unit can be driven by said bladder to move upwardly along said vertical support during upward movement of said bladder and that said weight unit can be 20 moved downwardly along said vertical support by gravity when said bladder is deflated;
wherein said bladder has top 5 and bottom ends, and is provided with a top check valve mounted on said top end of said bladder and operable for deflation of said bladder, and a bottom check valve mounted on said bottom end of said bladder and operable for inflation of said bladder; and
said buoyancy power generating apparatus further comprises an inflating mechanism that includes a cylinder secured to said vertical support, a piston secured to and disposed below said weight unit and co-movable with said weight unit so as to be movable into and out of said cylinder, and a gas valve in fluid communication with said cylinder and disposed in said tank for releasably connecting with said bottom check valve.

4. The buoyancy power generating apparatus of claim 3, wherein said inflating mechanism further includes a gas-storing container connected to and disposed below said tank and connected to and in fluid communication with said cylinder, said gas valve being connected to and in fluid communication with said gas-storing container.

5. The buoyancy power generating apparatus of claim 1, wherein said transmission includes first and second endless linking elements and a clutch, said clutch including an upper shaft, an outer sleeve sleeved rotatably on said upper shaft for driving rotation of said upper shaft, 5 a first upper gear provided on said upper shaft, and a second upper gear provided on said outer sleeve, said second endless linking element being trained on said second upper gear and connected to said bladder support so as to drive rotation of said outer sleeve when said buoyancy mechanism is moved upwardly by the buoyant force, said first endless linking element being trained on said first upper gear and being connected to said weight unit so as to lift said weight unit through rotation of said upper shaft driven by said outer sleeve when said buoyancy mechanism is moved upwardly by the buoyant force.

6. The buoyancy power generating apparatus of claim 5, wherein said upper shaft is formed with an outer thread, said clutch further including a cam secured to said outer sleeve, and an inner sleeve disposed in said outer sleeve, sleeved around said upper shaft and formed with an inner thread and a helically-extending slot, said slot being defined by a slot-defining wall, said cam extending into said slot and being in sliding contact with said slot-defining wall so as to drive axial movement of said inner sleeve relative to said upper shaft when said outer sleeve rotates, said inner thread being moved toward said outer thread to threadedly engage said outer thread when said outer sleeve rotates in a first rotational direction and being moved away from said outer thread to threadedly disengage said outer thread when said outer sleeve rotates in a second rotational direction opposite to said first rotational direction.

7. The buoyancy power generating apparatus of claim 6, wherein said transmission further includes a bracket, a pawl mounted swingably on said bracket, a ratchet gear mounted on said upper shaft so as to be co-rotatable with said upper shaft, and a pawl controlling member, said ratchet gear sliding over said pawl when said upper shaft rotates in the first rotational direction and being releasably caught by said pawl when said upper shaft rotates in a second rotational direction opposite to said first rotational direction, said pawl controlling member being associated with said pawl in such a manner that said pawl can be controlled to swing to a releasing position by said pawl controlling member so as to release said ratchet gear from being caught by said pawl when said upper shaft together with said ratchet gear rotates in the second rotational direction.

8. The buoyancy power generating apparatus of claim 6, wherein said clutch further includes a bearing sleeve disposed between said upper shaft and said inner sleeve, sleeved on said upper shaft and in sliding contact with said inner sleeve.

9. The buoyancy power generating apparatus of claim 1, wherein said tank is provided with a plurality of guiding rails extending along the length of said tank, said bladder support being in sliding contact with said guiding rails so as to permit said buoyancy mechanism to be glidable on said guiding rails during upward or downward movement of said buoyancy mechanism along said tank.

10. A buoyancy mechanism for a buoyancy power generating apparatus, comprising:
a bladder; and
a collapsible cage surrounding and urging against said bladder so that said collapsible cage can be extended by expansion of said bladder when said bladder is inflated and can provide a contraction force acting on said bladder;
wherein said collapsible cage includes an upper rod support connected to said bladder, a lower rod support connected to said bladder and disposed below said upper rod support, a plurality of upper pivot links pivoted to said upper rod support, a plurality of lower pivot links pivoted to said lower rod support, a plurality of first vertical rods having opposite ends that are connected respectively to a respective one of said upper pivot links and a corresponding one of said lower pivot links, and at least one elastic ring connected to said first vertical rods for urging said first vertical rods to abut against said bladder.

* * * * *